Figure 2:
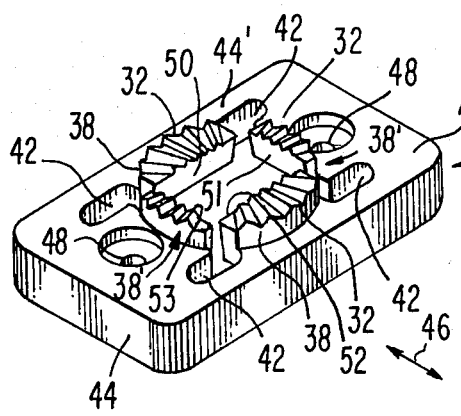

United States Patent [19]
Kongelka

[11] 4,071,217
[45] Jan. 31, 1978

[54] RELEASABLE MOUNTING SYSTEM

[75] Inventor: Robert Michael Kongelka, Washington, Pa.

[73] Assignee: RCA Corporation, New York, N.Y.

[21] Appl. No.: 728,427

[22] Filed: Sept. 30, 1976

[51] Int. Cl.$^2$ .............................................. B60R 1/04
[52] U.S. Cl. .......................... 248/309 R; 248/475 A; 248/178; 403/DIG. 3
[58] Field of Search ............... 248/309 R, 475 A, 178, 248/186, 183, 477, 478, 475 B; 403/224–228, DIG. 3, DIG. 4

[56] References Cited
U.S. PATENT DOCUMENTS

| | | | |
|---|---|---|---|
| 3,560,034 | 2/1971 | Hipsher et al. | 403/228 |
| 3,841,769 | 10/1974 | Bowerman | 248/478 X |
| 3,856,424 | 12/1974 | Beck, Jr. et al. | 403/227 |
| 3,887,156 | 6/1975 | Hugonnier | 248/475 A |

*Primary Examiner*—Marion Parsons, Jr.
*Attorney, Agent, or Firm*—Eugene M. Whitacre; Paul J. Rasmussen; Robert L. Troike

[57] ABSTRACT

A releasable mounting system includes a deformable bracket for holding an article. The bracket is formed with a recess which deforms with the bracket. A second element which is fixed to a support is also deformable and includes a plurality of tangs the inner surfaces of which define a central opening and the outer surfaces of which abut the inner walls of the recess. A wedge located in the central opening and secured to the bracket wedges the tangs against the recess walls. Upon distortion of the bracket, the recess distorts permitting at least one of the tangs to disengage from the recess, the central opening to enlarge, and the wedge to pass through the opening, thereby disengaging the article from the support.

7 Claims, 5 Drawing Figures

U.S. Patent  Jan. 31, 1978  4,071,217

RELEASABLE MOUNTING SYSTEM

The present invention relates to an article support which releases upon receipt by the article of an undesirable force.

Release systems are known which include one or more members that fracture or are otherwise destroyed when subjected to an unusual force. This is undesirable and expensive for consumer products such as, for example, citizens' band (CB) radios which are currently achieving a high degree of popularity. When a CB radio is mounted in an automobile or other vehicle, the radio and mounting support are usually secured in a manner that should a passenger impact with the radio in an accident situation, the passenger may get hurt and/or the radio and radio mounting system may become damaged.

A release system embodying the present invention includes a deformable first element which may hold an article and a deformable second element which may be fixed to a support. Both elements are held together by a wedge member which is secured to one of the elements and which wedges it to the other element at the inner surfaces defining an opening in the other element. In response to a sufficient force on the first element, the first element distorts sufficiently to permit enlargement of the opening in the one element by the wedging action of the wedge member and the latter to pass through this opening, whereby the two elements separate.

IN THE DRAWING

Figure 1:
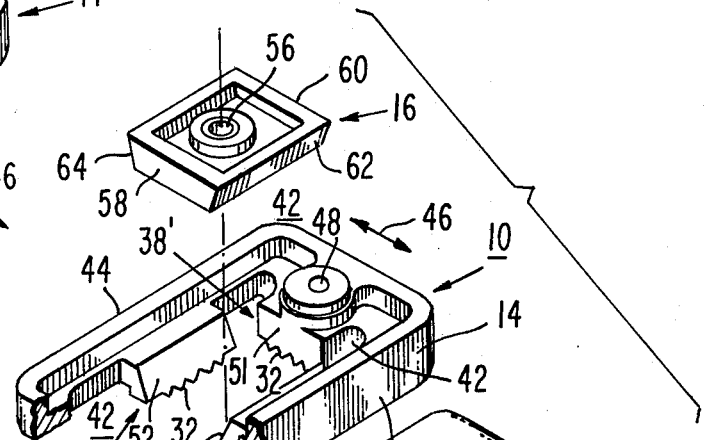
Figure 4:
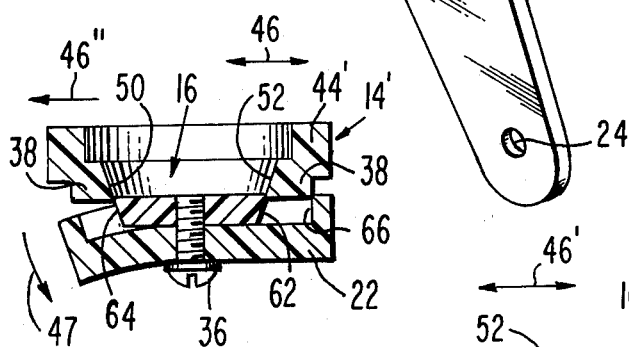
Figure 3A:
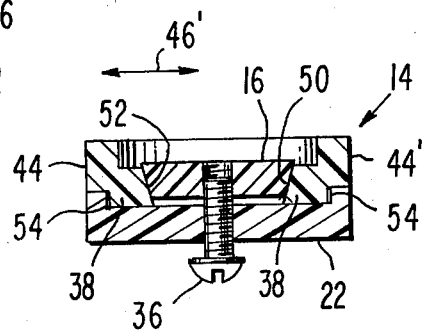
Figure 3B:
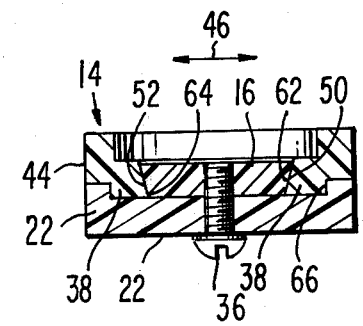

FIG. 1 is an exploded, isometric fragmented view of an apparatus constructed and operated in accordance with the present invention, FIG. 2 is an isometric view of the deformable support of FIG. 1, FIGS. 3a and 3b are sectional views along lines 3—3 of FIG. 1 taken under different conditions, and FIG. 4 is an additional sectional view similar to the views of FIGS. 3a and 3b useful in explaining the operation of the apparatus in FIG. 1.

In FIG. 1 apparatus 10 includes a deformable article support bracket 12, a deformable support 14 and a wedge member 16. Bracket 12 is a U-shaped yoke member having first and second legs 18 and 20 which are identical and facing each other, and cross member 22 which joins the legs. Legs 18 and 20 each include an aperture 24, respectively, for receiving the securing elements, such as bolts or the like, of an article such as a citizens' band radio (not shown). The legs 18 and 20 and cross member 22 are made out of thermoplastic material and are a flat, thin structure, readily deformable upon impact. However, the members 22 and legs 18 are sufficiently resilient so as to return to their original state upon release of the impact forces.

The cross member 22 includes a thicker center portion 26. A shallow, circular recess 28 defined by wall 66 is disposed approximately centrally in portion 26. The shallow depth is important as will be discussed later. Bottom wall surface 30 of the recess 28 is serrated in a suitable manner to prevent rotation of the support 14 which has corresponding mating serrations 32 in engagement with surface 30. Centrally disposed in recess 28 is a through-hole 34. Hole 34 receives assembly screw 36 which is inserted therethrough. Screw 36 secures bracket 12, support 14 and member 16 together.

Support 14 is rectangular in shape and is best seen in FIG. 2 which illustrates the underside of the support of FIG. 1. Support 14 is made out of a suitable thermoplastic material having a first pair of identical oppositely disposed tangs 38 and a second pair of identical oppositely disposed tangs 38'. Tangs 38 and 38' extend above and project beyond surface 40 of support 14. The extended surfaces of the tangs 38 and 38' terminate in the serrations 32 noted above. Each of the next adjacent tangs 38 and 38' are divided by a groove 42. Each of the grooves 42 extends in a direction along the longitudinal axis of support 14 normal to direction 46. Grooves 42 form support 14 into a pair of oppositely disposed elongated relatively thin-walled sections 44 and 44' which are flexible in the transverse direction 46. Sections 44 and 44' deform in direction 46 when subjected to a radial outwardly directed force. A pair of mounting apertures 48 are disposed in support 14 for securing support 14 to a suitable base. The tangs 38 are formed with slightly inwardly tapered internal walls 50 and 52, respectively. The tangs 38' are formed with straight internal walls 51 and 53, respectively. The walls 50 and 52 are tapered toward each other so that the portions thereof next adjacent the serrations 32 are closest together. This can best be seen in FIG. 3a, 3b, and FIG. 4. The normal freestanding condition of the sections 44 and 44' is such that tangs 38 fit loosely within the recess 28 of bracket 12. This is best seen in FIG. 3a. Note in FIG. 3a the gap 54 between tangs 38' and wall 66.

Disposed contiguous with tapered walls 50–52 is wedge member 16. Wedge member 16 is a rectangular thermoplastic member having a central aperture 56 which is threaded to receive screw 36. Member 16 has two end walls 58 and 60 which engage walls 51 and 53, respectively. Walls 51, 53, 58 and 60 do not taper and are parellel to the longitudinal axis X of screw 36. Wedge member 16 has two tapered walls 62 and 64 which complement tapered walls 50 and 52, respectively. The transverse width of wedge member 16 from wall 62 to wall 64 is such that when the lowermost surface facing serrations 30 of recess 28 are contiguous with the tang serrations 32 (FIG. 3b) the tangs 38 are forced in the radial outward direction 46 by the wedge member 16. This action wedges tangs 38 against wall 66 recess 28. In FIG. 3b, wedge member 16 is tightened fully against bracket 12 by screw 36.

Upon deformation of the bracket due to an impact force received on one or the other of legs 18 and 20, the recess 28 deforms slightly. This deformation is illustrated in FIG. 4. The depth of the recess 28 is such that when the bracket 12 is deformed, the deformation is sufficient to disengage by a torque in direction 47 wall 66 from engagement with the tangs 38 and 38'. This is achieved by the initial disengagement of section 44, tang 38, from wall 66. Once this disengagement occurs, the wedge 16 forces in the direction 46 tend to separate the thin-walled sections 44 and 44', flexing them outwardly in direction 46, and completely disengaging the support 14', FIG. 4, from wedge 16. As a result, the article (not shown) secured to bracket 12 is completely separated from the support 14 which is firmly secured to a suitable base.

Upon removal of the impact force thereupon, the bracket and support return to the original position due to their resiliency. To reinstall the bracket 12 in engagement with support 14, screw 36 is loosened and disengaged from wedge 16. The support 14 is inserted around the wedge 16 and into the recess 28 and the screw 36 is then tightened. The tightening action once again wedges the support 14 against the walls 66 of recess 28, firmly securing support 14 to the bracket 12. In the alternative, support 14 may be left bolted in place and wedge 16 inserted by angling the entry. Wedge 16 is then left disposed in a level position with respect to member 22 and screw 36 started.

It will be appreciated that the depth of wall 66 and the flexibility of the bracket 12 may be set in a manner well known in the thermoplastic manufacturing mechanics art so that the bracket 12 will release from the support 14 under any given predetermined loading conditions. The greater the depth of the wall 66, of course, the greater the distortion required of the bracket 12 to release the support 14. Further, the thicker and heavier the thin-walled sections 44 and 44', the greater will be the forces required to pull the wedge member 16 through the central aperture defined by the tangs 38 and 38'. Thus, any suitable set of conditions can be provided for in an apparatus constructed and operated in accordance with the present invention.

While one specific example of the invention is described above, it is to be understood that other alternatives are possible. For example, support 14 may be provided with a recess such as recess 28 facing cross member 22. Cross member 22 may be provided with a central opening defined by the inner surfaces of a plurality of tangs extending from member 22 towards support 14. The tangs on member 22 may be similar to tangs 50-53. Wedge member 16 in this instance is fixed to member 14 and below member 22, located in the aperture in 22. In response to a sudden force of sufficient magnitude applied to member 12, the depression in 14 would distort, one or more of the tangs on 12 would be released from the depression, and the wedging action of the wedge member would enlarge the opening in member 12 sufficiently to permit the wedge member to pass through the opening and the article (with element 12 attached thereto) to pull free.

What is claimed is:

1. A mounting system for releasably securing an article to a support comprising:
    a deformable first element for holding said article,
    a deformable second element arranged to be secured to said support,
    one of said first and second elements having an opening defined by deformable inner surfaces which deform with said one element, said one element includes tang means extending therefrom, and said other element includes wall means in engagement with said tang means,
    a wedge member secured to the other of said elements for wedging the one element to the other element at said inner surfaces with said wedge member element wedging said tang means against said wall means,
    said first element, in response to a sufficient force, disengaging said tang means from said wall means to permit enlargement of the opening by the wedging action of the wedge member and the latter to pass through the opening, whereby the two elements separate.

2. The system of claim 1 wherein:
    said wall means define a recess formed in said other element,
    said tang means are formed with inner surfaces which define said opening, and wherein
    said wedge member is disposed in said opening and engages said inner surfaces of said tang means for wedging said tang means against said wall means.

3. The system of claim 2 wherein:
    said recess is further defined by a bottom wall having a serrated surface, and wherein
    said tang means are formed with a serrated surface in engagement with said bottom wall surface.

4. The system of claim 1 wherein:
    said first element includes a "U" shaped yoke member further including first and second legs for supporting said article therebetween and depending from a cross member,
    said cross member is formed with a recess defined by an inner wall,
    said second element includes a plurality of tangs disposed in said recess, said tangs each having a first outer surface in engagement with said wall and an inner second surface forming said deformable inner surfaces, and wherein
    said wedge member is secured to said cross member and disposed in said opening.

5. The system of claim 4 further including:
    securing means for securing said wedge member to said cross member in a first direction, at least one of said tangs having a surface tapering toward said first direction, said wedge member having a tapered wedge surface corresponding to and in engagement with said one tang tapering surface for squeezing said tang against said inner wall.

6. The system of claim 4 wherein:
    said recess is further defined by a bottom wall, said tapered surfaces being arranged with respect to each other so that said wedge member squeezes said one tang against said bottom wall.

7. In an arrangement for releasably securing an article to a supporting member, in combination:
    a first element to whichf the article may be secured, said element formed of a deformable material and being formed with a depression therein defined by an inner wall and a base, said inner wall deforming in a direction generally perpendicular to said base of said depression when said element is deformed;
    a deformable element formed with means by which it may be secured to said supporting member, said second element being formed with tang elements having tapered inner surfaces, said tapered inner surfaces defining, at least in part, an aperture in said second element, and the outer surfaces of said tangs engaging said inner wall of said depression, when said second element is in place on said first element;
    a third element having tapered outer surfaces which mate with the tapered inner surfaces of said second element, when said third element is in place in said second element; and
    means mounted in said first element and engaging said third element for causing the third element to force the tangs of the second element against the inner walls of said depression in said second element, whereby when said first element is deformed more than a given amount, said inner wall of said depression deforms sufficiently to release the tang abutting that portion of said wall, permitting the aperture in said second member to deform sufficiently that said third element passes through said aperture.

* * * * *